United States Patent [19]

Nagano

[11] Patent Number: 5,085,620
[45] Date of Patent: Feb. 4, 1992

[54] MULTI-GEAR CLUSTER FOR BICYCLE

[75] Inventor: Masashi Nagano, Izumi, Japan

[73] Assignee: Shimano Corporation, Osaka, Japan

[21] Appl. No.: 579,962

[22] Filed: Sep. 10, 1990

[30] Foreign Application Priority Data

Sep. 12, 1989 [JP] Japan ................................. 1-236032

[51] Int. Cl.5 ............................................. F16H 55/30
[52] U.S. Cl. ............................................................ 474/152
[58] Field of Search ................ 474/152, 153, 155–157, 474/77–78, 160

[56] References Cited

U.S. PATENT DOCUMENTS

| 4,181,033 | 1/1980 | Nagano | 474/156 |
| 4,773,893 | 9/1988 | Su et al. | 474/152 |

FOREIGN PATENT DOCUMENTS

| 002903 | 7/1979 | European Pat. Off. . |
| 03445 | 2/1981 | European Pat. Off. . |
| 3037857 | 4/1981 | Fed. Rep. of Germany . |
| 2610279 | 8/1988 | France | 474/78 |
| 2638702 | 11/1990 | France . |

Primary Examiner—Thuy M. Bui
Attorney, Agent, or Firm—Dickstein, Shapiro & Morin

[57] ABSTRACT

A multi-gear cluster for a bicycle having at least two gears of different diameters. The larger gear includes at a peripheral part thereof a disengagement-facilitating portion for facilitating a disengaging motion of a drive chain from the teeth of the larger gear and also a subsequent shifting motion of the chain toward the smaller gear adjacent the larger gear. The teeth of the smaller gear are provided with a phase arrangement relative to the disengagement-facilitating portion such that the chain comes into engagement with the teeth of the smaller gear where a portion of the chain is displaced by the disengagement-facilitating portion toward the smaller gear from a center of thickness of the larger gear.

10 Claims, 6 Drawing Sheets

MULTI-GEAR CLUSTER FOR BICYCLE

BACKGROUND OF THE INVENTION

1. Field of the Invention

The present invention relates to a multi-gear cluster for a bicycle, and more particularly to a multi-gear cluster having more than two gears of different diameters.

2. Description of the Related Art

Figure 11:
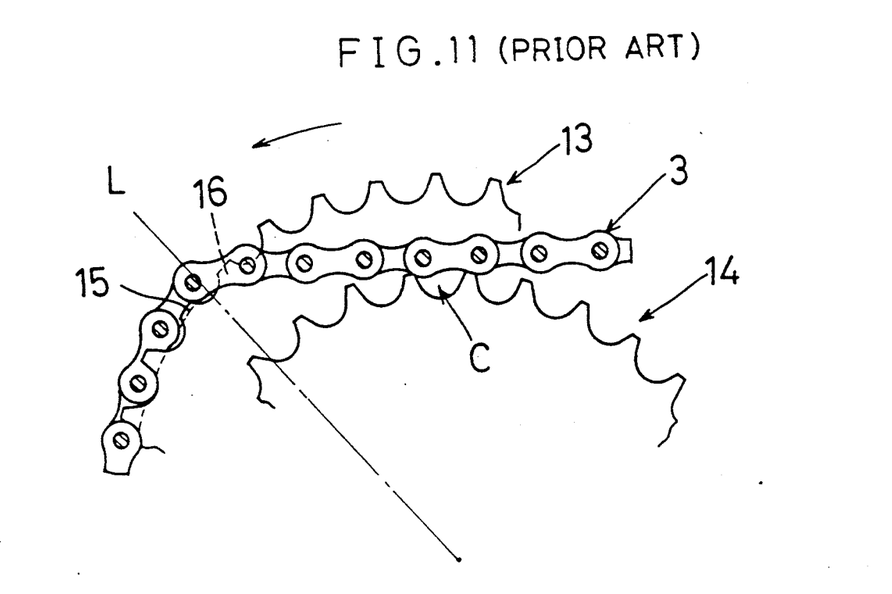

Referring to FIG. 11 which shows a conventional multi-gear cluster, the prior art has provided various arrangements for facilitating a shifting movement of a chain 3 from a large gear 13 to an adjacent small gear 14 by e.g. cutting away top edges of some teeth 15, 16 of the large gear 13 or biasing these edges towards the small gear 14 (see the Japanese published patent gazette No. 56-3230).

Such conventional arrangements, however, have paid no consideration to the rotational phase relationship between the teeth 15, 16 of the large gear and the teeth of the small gear, so that the relationship remains irregular. Accordingly, in a change speed operation by shifting the chain between the gears, a portion of the chain 3 displaced (by means of a derailleur) towards the small gear 14 from a center of thickness of the large gear 13 fails to engage the teeth of the small gear 14, 16 and just rides over the top edges of the teeth at a shifting position C. Then, a perfect engagement between the chain 3 and the small gear 14 occurs only after the large gear 13 rotates for a few times. This not only impairs a smooth chain shifting operation but also, in a worse case, causes a complete derailment of the chain into the gap between the adjacent gear pair, thus completely disabling the entire bicycle drive system.

Taking the above-state of the art into consideration, the primary object of the present invention is to provide an improved multi-gear cluster for a bicycle which always permits a smooth and reliable chain shifting operation from the large gear to the small gear, the invention's cluster being superior also for being simple in construction and economical to manufacture.

SUMMARY OF THE INVENTION

For accomplishing the above-noted object, a multi-gear cluster for a bicycle having at least two gears of different diameters, according to the first characterizing feature of the present invention, the larger gear includes at a peripheral part thereof a disengagement-facilitating portion for facilitating a disengaging motion of the drive chain from the teeth of the larger gear and also a subsequent shifting motion of the chain toward the smaller gear adjacent the larger gear; and, the teeth of the smaller gear are provided with a phase arrangement relative to the disengagement-facilitating portion such that the chain comes into engagement with the teeth of the smaller gear where a portion of the chain is displaced by the disengagement-facilitating portion toward the smaller gear from a center of thickness of the larger gear.

Preferably, according to the second characterizing feature of the invention, said disengagement-facilitating portion comprises a first tooth having a reduced height and a top ridge thereof displaced toward the smaller gear or a chamferred lateral face; and, the larger gear includes a second tooth rearwardly of the first tooth relative to a rotational direction of the gear cluster; the second tooth coming into abutment against an inner face of a link element of the displaced chain portion, the link element being opposed to the other link element adjacent the smaller gear; and the teeth phase arrangement of the smaller gear relative to the disengagement-facilitating portion being predetermined with reference to the second tooth. Functions and effects of the above-described features of the invention will be detailed next.

According to the first characterizing feature of the invention, when a rider effects a change speed operation, the chain starts its lateral shifting motion at the engagement-facilitating portion. Then, since the teeth of the smaller gear are provided with the phase arrangement relative to the disengagement-facilitating portion such that the chain comes into engagement with the teeth of the smaller gear where the portion of the chain is displaced by the disengagement-facilitating portion toward the smaller gear from a center of thickness of the larger gear, the displaced chain portion quickly and reliably comes into engagement with the smaller gear teeth.

Further, according to the second characterizing feature of the invention, since the disengagement-facilitating portion comprises a first tooth having a reduced height and a top ridge thereof displaced toward the smaller gear or a chamferred lateral face, this disengagement-facilitating portion can be formed easily and inexpensively. Also, since the larger gear includes a second tooth rearwardly of the first tooth relative to a rotational direction of the gear cluster and this second tooth comes into engagement with an inner face of a link element of the displaced chain portion, the link element being opposed to the other link element adjacent the smaller gear, this second tooth acts as a fixed pivot for the chain portion disengaged from the large gear teeth. Moreover, since the teeth phase arrangement of the smaller gear relative to the disengagement-facilitating portion is predetermined with reference to the second tooth, the displaced chain portion can reliably come into engagement with the smaller gear teeth regardless of possible irregularities in the operational amount of the derailleur.

As described above, the displaced chain portion immediately and reliably comes into engagement with the smaller gear teeth. Therefore, the chain shifting operation for a change speed can be completed approximately within 180 degree rotation of the gear cluster. Thus, the invention has fully achieved the intended object of providing an improved multi-gear cluster for a bicycle which always permits a smooth and reliable chain shifting operation from the larger gear to the smaller gear, the cluter being superior also for being simple in construction and economical to manufacture.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of the present invention; in which.

DESCRIPTION OF THE PREFERRED EMBODIMENTS

Preferred embodiments of the invention will now be described in particular, with reference to FIGS. 1 through 6.

Figure 6:
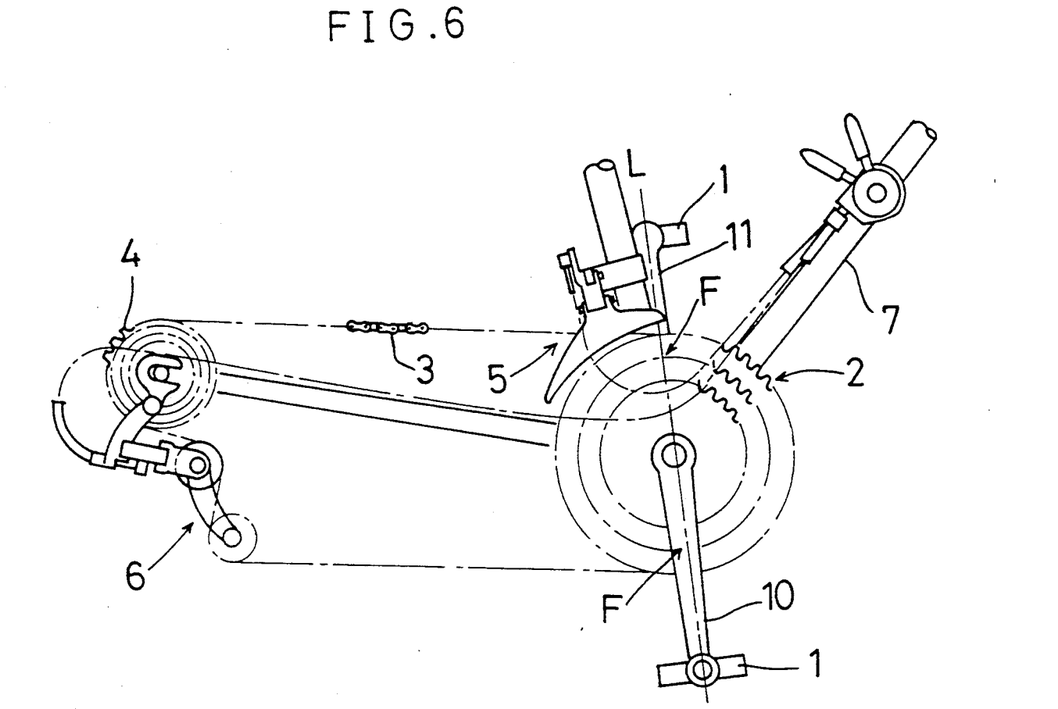
FIG. 6 is a side view showing an entire bicycle drive system including the gear cluster, and FIGS. 7 through 10 respectively illustrate further embodiments of the bicycle multi-gear cluster of the invention.

FIG. 6 shows a bicycle drive system including a multi-gear cluster of the invention, which is constructed as a front gear or sprocket assembly 2. In this system, as a bicycle rider applies his leg force to a pedal 1 thus to the multi-gear cluster 2, this force is transmitted through a drive chain 3 to a rear gear or sprocket cluster 4 and then to a rear wheel of the bicycle. A speed change operation is possible by shifting the chain 3 among the gears of the front and/or rear gear clusters 2 and 4, by means of a front derailleur 5 and a rear derailleur 6, respectively.

Figure 2:
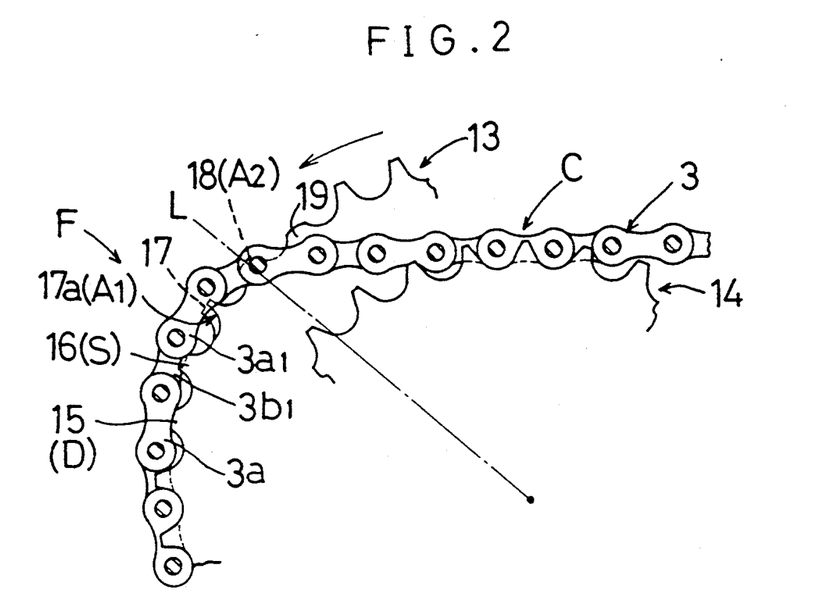
FIGS. 2 and 3 are enlarged views showing major portions of the bicycle multi-gear cluster of FIG. 1.
Figure 3:
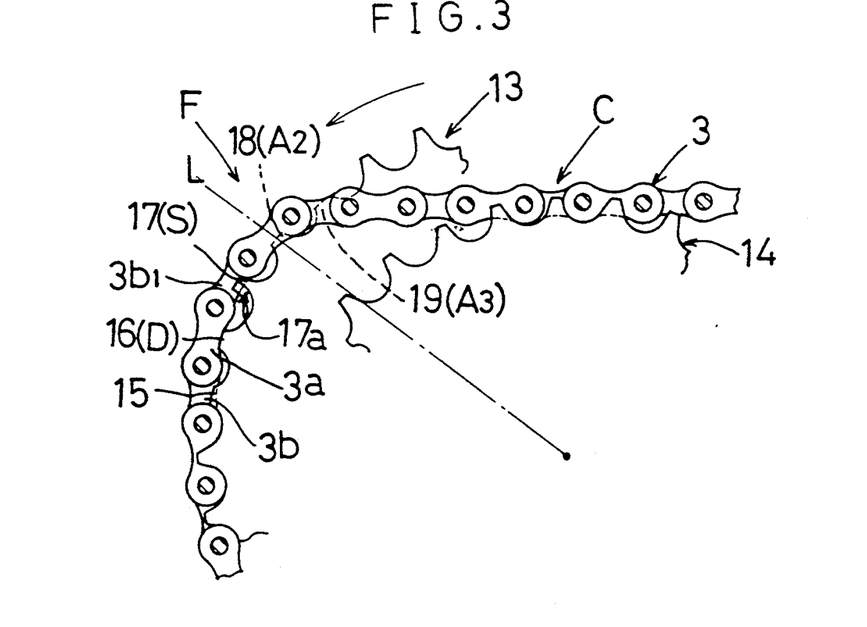
Figure 4:
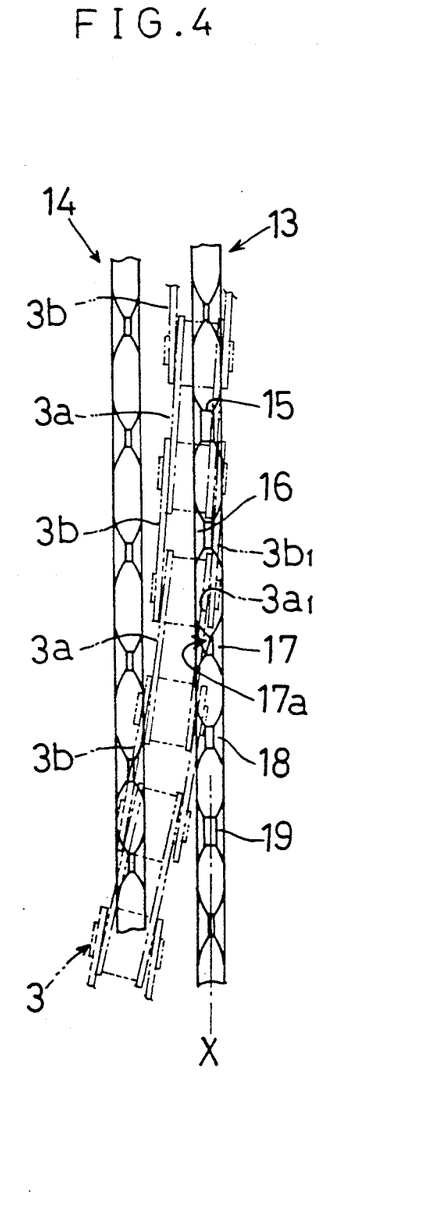
FIG. 4 is a plane view corresponding to FIG. 2.

The drive chain 3, as shown particularly in FIGS. 2 through 4, comprises an endless chain loop consisting of pluralities of opposed pairs of roller links 3a each pair forming a relatively small clearance with the gear teeth and opposed pairs of pin links 3b each pair forming a relatively large clearance with the gear teeth, with the roller link pairs 3a and pin link pairs 3b being connected alternately to one another to form the endless chain loop. The pin link pairs 3b provide the large clearance for facilitating a lateral, i.e. width-wise movement of the chain 3 needed for the chain shifting operation. Indidentally, FIGS. 2 and 3 show only one lateral side of the chain 3.

Figure 5:
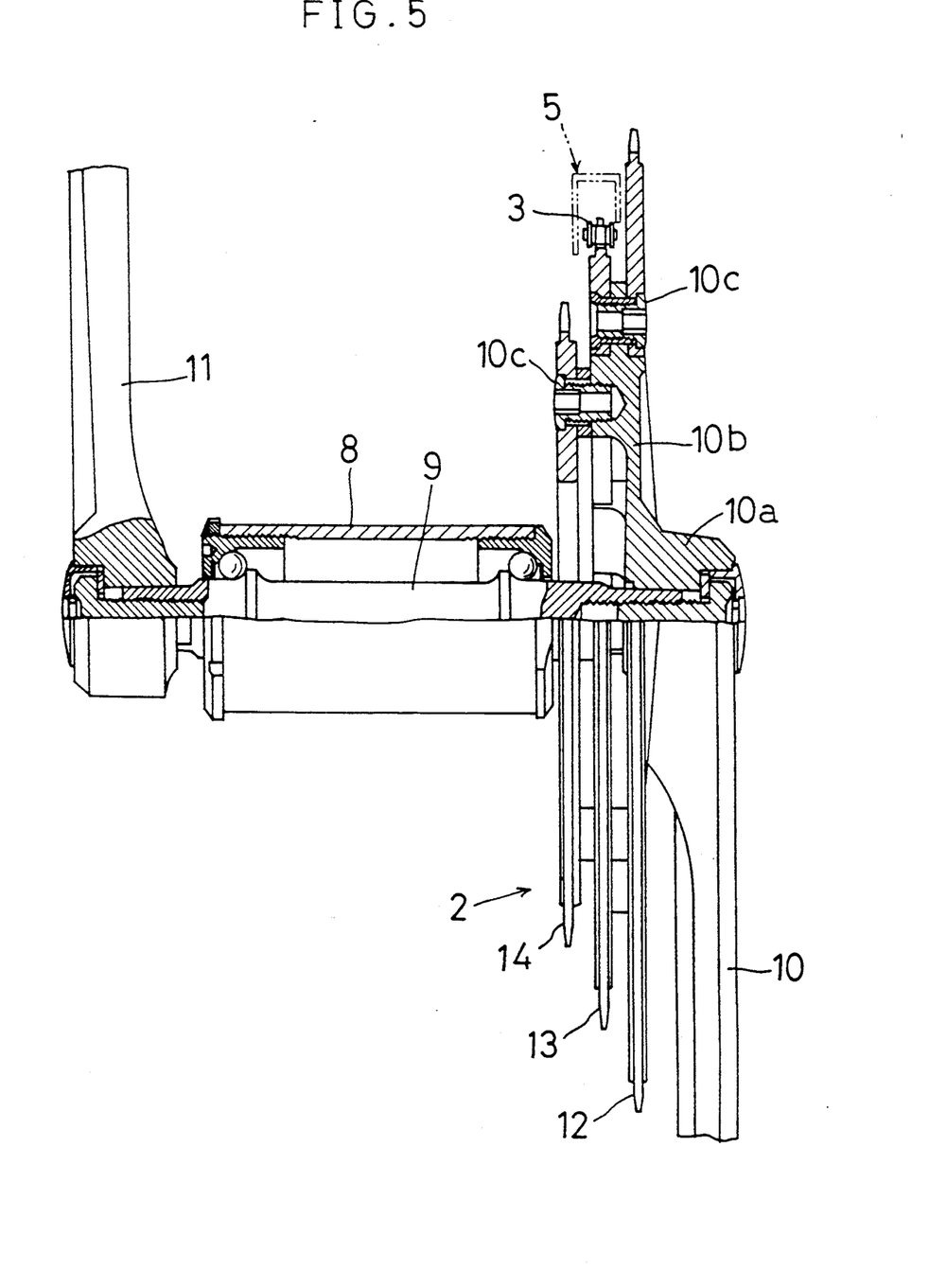
FIG. 5 is a section view showing the vicinity of the multi-gear cluster.

Referring now to FIG. 5, a hanger 8 of a bicycle frame close to the pedals, rotatably supports a crank shaft 9 on which right and left crank arms 10, 11 are fixedly secured with 180 degree displacement therebetween for supporting the pedals 1, 1. Further, an arm 10b extending radially from a boss 10a of the right crank arm 10 fixedly carries thereon a large gear 12, a middle gear 13 and a small gear 14 with predetermined axial distances therebetween, thus together constructing the multi-gear cluster 2.

In this particular embodiment, only the middle gear 13 as generically representing the "larger" gear and the small gear as representing the "small" gear will be described.

As is well-known from the biomechanical study, the leg input force from the pedals 1 to the multi-gear cluster 2 is minimum where the crank arms 10 and 11 are positioned substantially vertical as illustrated in FIGS. 5 and 6. Then, in the instant embodiment, there are provided disengagement-facilitating areas F at two gear peripheral portions in these phases where the longitudinal axis of the crank arms 10 and 11 is located and the leg input force is minimum. That is to say, at the top and bottom dead points where the crank arms 10 and 11 are oriented substantially vertical, the leg input force is minimum thus the minimum tension acts on the chain 3. Therefore, the reduced tension makes it easier for the chain 3 to effect a lateral motion which is one requirement for a change speed operation. This helps disengagement-facilitating portions (to be detailed later) to fully achieve their function. It is also conceivable to provide the disengagement-facilitating area F at more than two gear peripheral portions depending on the convenience. The disengagement-facilitating are F includes the above-mentioned disengagement-facilitating portion D for facilitating disengagement of the chain 3 from the teeth of the middle gear 13 and also displacement of the disengaged chain portion toward the small gear 14, a stopper portion S for coming into abutment against an inner face of a link 3b1 of a pin link pair 3b, the link 3b1 being opposed to the other link facing the small gear 14 (i.e. the link 3b1 faces the large gear 12) and a disengagement-assisting portion A for assisting the disengaging action of the chain 3 by the disengagement-facilitating portion D.

More particularly, the disengagement-facilitating area F, as shown in FIGS. 1 through 4, includes first through third teeth 15, 16 and 17 having gradually increased tooth heights rearwardly relative to the rotational direction of the middle gear 13 (this side will be referred to as "the rear side" while the other side will be referred to as "the forward side", hereinafter). As shown particularly in FIGS. 2 and 4, the first tooth 15 has the relatively reduced tooth height so that this tooth 15 acts as the aforementioned disengagement-facilitating portion D for permiting or facilitating a 'riding' motion of the roller link pair 3a when the first tooth 15 comes into positional correspondance with the roller link pair 3a. The second tooth 16 has a slightly greater tooth height than the first tooth 15 so that this second tooth 16 acts as the stopper portion S for coming into abutment against the inner face of the link 3b1 of the pin link pair 3b facing the large gear when the second tooth 16 comes into positional correspondence with the pin link pair 3b. Further, as best shown in FIG. 3, the third tooth 17 has a further increased tooth height relative to the second tooth 16 so that this third tooth 17 allows the second tooth 16 to act as the disengagement-facilitating portion and also the third tooth 17 per se acts as the stopper portion S when the second tooth 16 comes into positional correspondence with the roller link pair 3a.

The disengagement-assisting portion A serves to restrict disadvantageous interference between the middle gear 13 and the portion of the chain 3 displaced by the disengagement-facilitating portion D toward the small gear 14 relative to a central plane X of the teeth train. More specifically, as shown in FIGS. 2 through 4, this disengagement-assisting portion A consists of a first disengagement-assisting part A1 comprising a chamferred lateral face 17a of the third tooth 17 facing the small gear 14 and of second and third disengagement-assisting parts A2 and A3 comprising fourth and fifth teeth 18 and 19 rearwardly of and having reduced tooth heights relative to the third tooth 17. That is, as illustrated in FIGS. 2 and 4, when the first tooth 15 comes into positional correspondence with the roller link pair 3a, the link 3a1 (facing the middle gear 13) of the roller link pair 3a runs beside the first disengagement-assisting portion A1 at the third tooth 17 facing the small gear 14, so that the second disengagement-assisting part A2 prevents the pin link pair 3b succeeding to the link pair 3a from engaging with the fourth tooth 18. On the other hand, as illustrated in FIG. 3, when the roller link pair 3b comes into positional correspondence with the second tooth 16, the second and third disengagement-assisting parts A2 and A3 serve to prevent the roller link pair 3a and pin link pair 3b from engaging the fourth and fifth teeth 18 and 19, respectively. Incidentally, as shown in FIG. 1, it is preferred that the fourth tooth 18 be close to the phase where the longitudinal center line L of the right crank arm 10 is located.

If a change speed operation is effected when the first tooth 15 corresponds to the roller link pair 3a, as shown in FIGS. 2 and 4, the portion of the chain 3 rearward relative to that chain portion corresponding to the second tooth 16 does not engage with the teeth of the middle gear 13 and is displaced toward the small gear 14 from the gear-thickness-wise center plane X of the middle gear 13. In the course of this, as illustrated in FIG. 2, the second tooth 16 acts as a pivot for the disengaged and displaced chain portion. That is, in the present invention, the teeth phase arrangement of the small gear 14 relative to the disengagement-facilitating portion D is predetermined with reference to the second tooth 16 positioned rearwardly of the first tooth 15 acting as the disengagement-facilitating portion D so that the chain 3 comes into engagement with the teeth of the small gear 14 at an area C where the above-described displaced chain portion is shifted toward the small gear 14.

Further, with the invention's multi-gear cluster described above, two pairs respectively of the disengagement-facilitating portions D, stopper portions S and disengagement-assisting portions A are provided in each disengagement-facilitating area F with one pitch displacement therebetween. Therefore, as will be detailed later, a change speed operation can be reliably effected whether the roller link pair 3a or the pin link pair 3b happens to correspond to the first tooth 15.

Figure 1:
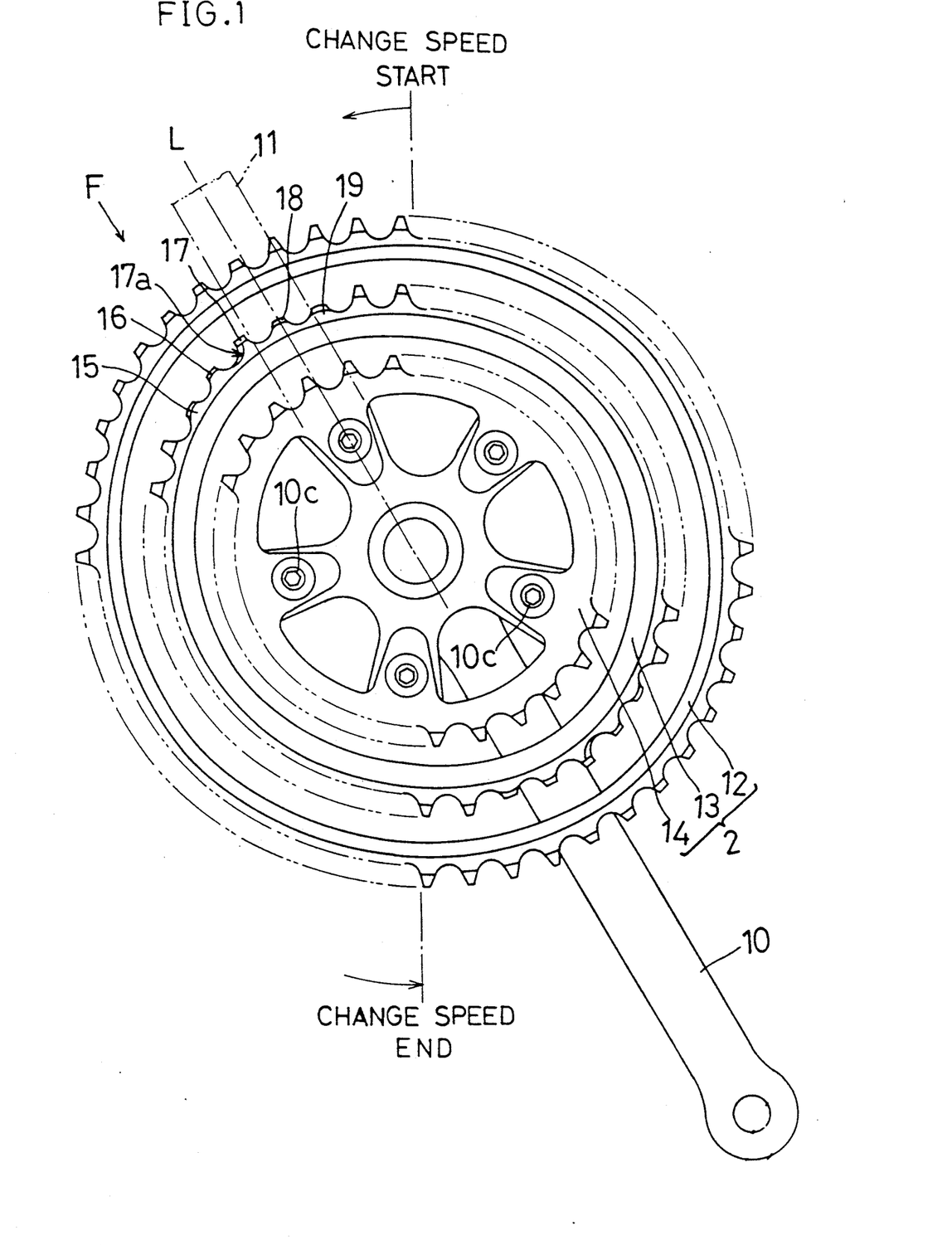
FIG. 1 is a side view illustrating a change speed condition of a multi-gear cluster for a bicycle.

First, if the chain 3 is pressed toward the small gear 14 by the front derailleur 5 when the roller link pair 3a corresponds to the first tooth 15, as illustrated in FIGS. 1, 2 and 4, the second tooth 16 acts as a fixed pivot and the rear portion of the chain 3 relative to the preceeding chain portion corresponding to the second tooth 16 becomes free from engagement and moves close to the small gear 14. Then, since the second tooth 16 keeps acting as the fixed pivot for the above-described, disengaged and displaced chain portion until this chain portion comes into engagement with the teeth of the small gear 14, this engagement takes place accurately and reliably while the middle gear 13 effects a 180 degree rotation after the start of the change speed operation.

On other hand, if the above-described change speed operation is started when the roller link pair 3a corresponds to the second tooth 16, i.e. when the pin link pair 3b corresponds to the first tooth, as illustrated in FIG. 3, the change speed operation is effected with the third tooth 17 acting as the fixed pivot for the chain portion. In this case too, since the phase difference between the second tooth 16 and the third tooth 17 is only one pitch amount, the engagement between the small gear teeth and the displaced chain portion takes place reliably as well.

FURTHER EMBODIMENTS

Some other embodiments of the invention will be specifically described next.

Figure 7:
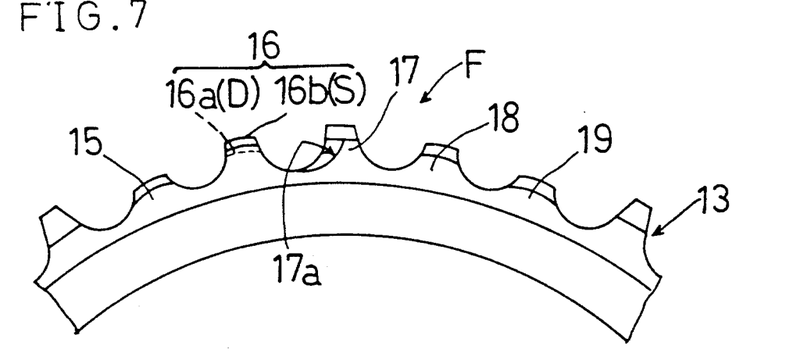
Figure 8:
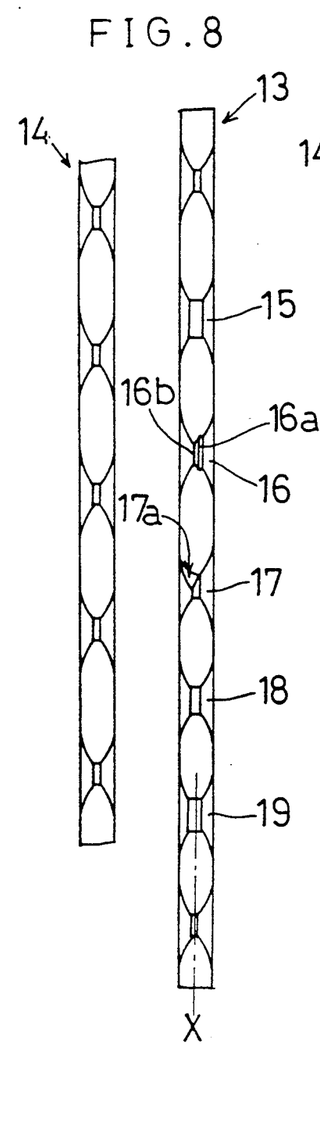

I. As shown in FIGS. 7 and 8, it is conceivable to form the second tooth 16 such that this tooth 16 has, on one side facing the large gear 12, a flat portion 16a of a tooth height substantially same as the first tooth 15 and has, on the other side facing the small gear 14, a projecting portion 16b as a fixed pivot for the displaced chain portion. With this arrangement, it becomes possible to minimize difference between the amount of displacement of the chain 3 toward the middle gear 13 when the roller link pair 3a rides over the top of the first tooth 15 and that when the roller link pair 3a rides over the flat portion 16a; hence, it becomes possible to minimize pitch irregularity between the small gear teeth and the displaced chain portion in these cases. Further, since this flat portion 16a is positioned lower than the top of the second tooth of the foregoing embodiment, the riding motion of the roller link pair 3a and the subsequent disengagement of the chain 3 can be further facilitated.

Figure 9:
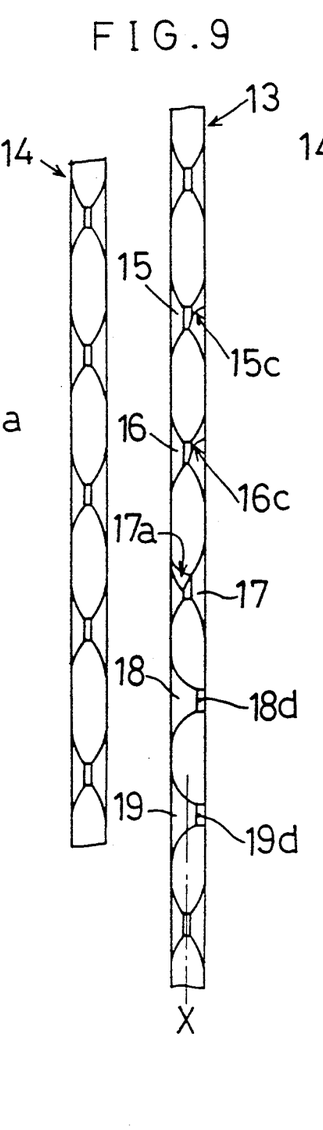
Figure 10:
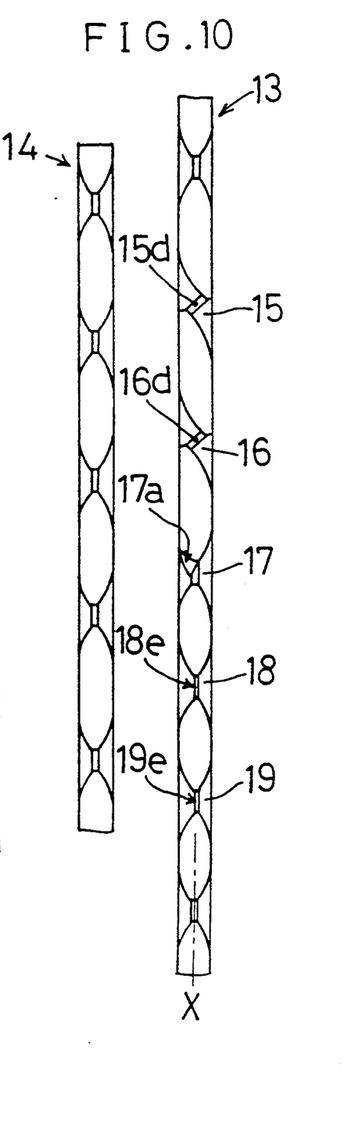

II. Further, alternately, as shown in FIG. 9, the first and second teeth 15, 16 can have chamferred portions 15c, 16c on the side of the large gear 12. Or, as shown in FIG. 10, the first and second teeth 15 and 16 can have clockwise-slant tops 15d, 16d. Further, these tops 15d, 16d can be displaced toward the small gear 14; that is, the tops 15d, 16d can be displaced in the opposite direction relative to tops 18d, 19d of the fourth and fifth teeth 18, 19. Further modifications of these teeth would be obvious for those skilled in the art.

III. As shown in FIG. 9, the fourth and fifth teeth 18 and 19 can have the tops 18d, 19d displaced toward the large gear 12. Or, as shown in FIG. 10, these fourth and fifth teeth can have chamferred portions 18e, 19e on the side facing the small gear 14. Specific constructions of these teeth could be modified in any other way by those skilled in the art.

IV. In case the first tooth 15 always corresponds to the roller link pair 3a or the roller link pair 3a and the pin link pair 3b have substantially the same width, it suffices for one disengagement-facilitating area F to have only one set of the disengagement-facilitating portion D, stopper portion S and the disengagement-assisting portion A. That is, it is also possible to form the disengagement-facilitating portion D by reducing the tooth height of only one tooth of the middle gear 13.

V. If the chain 3 can be displaced toward the small gear 14 by a sufficient amount by means of the disengagement-facilitating portion D alone, the disengagement-assisting portion A can be eliminated.

VI. In case the disengagement-facilitating portion D is formed by cutting of teeth of the middle gear 13 by a considerable amount and the portion D can no longer come into full engagement with the chain 3, a tooth positioned forwardly of this disengagement-facilitating portion D acts as the stopper portion S. That is to say, the specific position of the stopper portion S can be determined according to the particular construction of the disengagement-facilitating portion D.

VII. Aside from the middle and small gears 13 and 14 employed in the foregoing embodiments, the present invention can be embodied also in the combination of the large and middle gears 12 and 13. The invention can be further embodied in the rear multi-gear cluster 4.

VIII. In the foregoing embodiments, the phase of the teeth of the small gear relative to the disengagement-facilitating portion is determined with reference to the second tooth 16. Instead, the teeth phase can be determined with reference to the third tooth 17.

IX. The disengagement-facilitating portions D, stopper portions S, disengagement-assisting portions D can be formed alternately by e.g. using jigs provided separately from the middle gear 13, as well as by the tooth-cutting treatment of this gear 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A multi-gear cluster for a bicycle having at least two gears of different diameters, the cluster comprising:
disengagement-facilitating means for facilitating a disengaging motion of a drive chain from the teeth of the larger gear and a shifting motion of the chain from the larger gear toward the smaller gear, said disengagement-facilitating means being provided at a peripheral part of each gear other than the smallest gear, said disengagement-facilitating means including a first tooth having a reduced height and a second tooth positioned rearwardly of the first tooth relative to a direction of rotation thereof,
wherein the teeth of the smaller gear are provided with a phase arrangement relative to said disengagement-facilitating means of the larger gear such that said chain comes into engagement with the teeth of said smaller gear to be engaged while the disengagement-facilitating means engages with an inner face of a link element of the chain when the chain is shifted toward the smaller gear.

2. A multi-gear cluster as claimed in claim 1, wherein said second tooth has a reduced height, and wherein said disengagement-facilitating means includes a third tooth having a reduced height and positioned rearwardly of the second tooth relative to a direction of rotation thereof.

3. A multi-gear cluster as claimed in claim 2, wherein said first through third teeth have gradually increased heights rearwardly relative to said rotational direction.

4. A multi-gear cluster as claimed in claim 2, further comprising:
a disengagement-assisting portion for restricting interference between said larger gear and said portion of the chain displaced by said disengagement-facilitating portion toward said smaller gear relative to a central plane of the teeth train.

5. A multi-gear cluster as claimed in claim 4, wherein said disengagement-assisting portion includes a chamferred lateral face of said third tooth facing said smaller gear and second and third disengagement-assisting parts comprising fourth and fifth teeth provided rearwardly of and having reduced tooth heights relative to said third tooth.

6. A multi-gear cluster as claimed in claim 1, wherein said cluster comprises a front sprocket assembly having large, middle and small gears, said disengagement-facilitating portion being provided to said middle gear and said small gear, respectively.

7. A multi-gear cluster as claimed in claim 1, wherein said disengagement-facilitating portion is provided at each of top and bottom dead points of crank arms of the bicycle.

8. A multi-gear cluster for a bicycle having at least two gears of different diameters, the cluster comprising:
disengagement-facilitating means for facilitating a disengaging motion of a drive chain from the teeth of the larger gear and a shifting motion of the chain from the larger gear toward the smaller gear, said disengagement-facilitating means being provided at a peripheral part of each gear other than the smallest gear, said disengagement-facilitating means including a first tooth having a top ridge thereof displaced toward the smaller gear and a second tooth positioned rearwardly of the first tooth relative to a direction of rotation thereof,
wherein the teeth of the smaller gear are provided with a phase arrangement relative to said disengagement-facilitating means of the larger gear such that said chain comes into engagement with the teeth of said smaller gear to be engaged while the disengagement-facilitating means engages with an inner face of a link element of the chain when the chain is shifted toward the smaller gear.

9. A multi-gear cluster for a bicycle having at least two gears of different diameters, the cluster comprising:
disengagement-facilitating means for facilitating a disengaging motion of a drive chain from the teeth of the larger gear and a shifting motion of the chain from the larger gear toward the smaller gear, said disengagement-facilitating means being provided at a peripheral part of each gear other than the smallest gear, said disengagement-facilitating means including a first tooth having a chamfered lateral face and a second tooth positioned rearwardly of the first tooth relative to a direction of rotation thereof,
wherein the teeth of the smaller gear are provided with a phase arrangement relative to said disengagement-facilitating means of the larger gear such that said chain comes into engagement with the teeth of said smaller gear to be engaged while the disengagement-facilitating means engages with an inner face of a link element of the chain when the chain is shifted toward the smaller gear.

10. A multi-gear cluster for a bicycle having at least two gears of different diameters, the cluster comprising:
disengagement-facilitating means for facilitating a disengaging motion of a drive chain from the teeth of the larger gear and a shifting motion of the chain from the larger gear toward the smaller gear, said disengagement-facilitating means being provided at a peripheral part of each gear other than the smallest gear, said disengagement-facilitating means including a first tooth such defined to facilitate the shifting motion of the chain from the larger gear toward the smaller gear and a second tooth positioned rearwardly of the first tooth relative to a direction of rotation thereof,
wherein the teeth of the smaller gear are provided with a phase arrangement relative to said disengagement-facilitating means of the larger gear such that said chain comes into engagement with the teeth of said smaller gear to be engaged while the disengagement-facilitating means engages with an inner face of a link element of the chain when the chain is shifted toward the smaller gear.

* * * * *